US007297390B2

(12) United States Patent
Simmons et al.

(10) Patent No.: US 7,297,390 B2
(45) Date of Patent: Nov. 20, 2007

(54) STRUCTURAL POLYMER CORE ASSEMBLY, METHOD OF MANUFACTURE AND METHOD OF USE

(76) Inventors: Richard A. Simmons, 1419 Highland Bluff, Atlanta, GA (US) 30339; John R. Stoll, 455 Surveyor's Point, Suwanee, GA (US) 30024; Keith Panik, 365 Cherry Grove Rd., Ball Ground, GA (US) 30107; F. Arthur Simmons, 4250 Paran Walk NW., Atlanta, GA (US) 30327

( * ) Notice: Subject to any disclaimer, the term of this patent is extended or adjusted under 35 U.S.C. 154(b) by 0 days.

(21) Appl. No.: 10/352,803

(22) Filed: Jan. 28, 2003

(65) Prior Publication Data

US 2004/0081797 A1    Apr. 29, 2004

Related U.S. Application Data

(60) Provisional application No. 60/352,707, filed on Jan. 28, 2002.

(51) Int. Cl.
  *B32B 1/00*     (2006.01)
  *B60J 7/08*     (2006.01)
  *B60R 13/02*    (2006.01)
  *B62D 25/06*    (2006.01)

(52) U.S. Cl. .............. 428/178; 428/137; 428/138; 428/180; 296/214; 181/288; 181/290; 181/292; 52/789.1; 52/793.1

(58) Field of Classification Search .............. 428/137, 428/138, 178, 180, 185, 187, 542.2, 903.3; 181/288, 290, 291, 292; 296/214; 52/789.1, 52/793.1
See application file for complete search history.

(56) References Cited

U.S. PATENT DOCUMENTS

| | | | |
|---|---|---|---|
| 2,809,908 A | 10/1957 | French | 154/45.9 |
| 3,086,899 A | 4/1963 | Smith et al. | 154/45.9 |
| 3,199,963 A | 8/1965 | Bengtsson | 29/183 |
| 3,664,906 A | 5/1972 | Hartig | 161/68 |
| 3,822,762 A * | 7/1974 | Crispin et al. | 181/292 |
| 3,842,768 A | 10/1974 | Maistre | 114/16 |
| 3,849,237 A | 11/1974 | Zetlin | 161/68 |
| 3,884,646 A | 5/1975 | Kenney | 29/191.4 |
| 3,992,835 A | 11/1976 | Saveker | 52/220 |
| 4,025,996 A * | 5/1977 | Saveker | 428/594 |
| 4,290,248 A | 9/1981 | Kemerer et al. | 52/309.16 |
| 4,348,442 A * | 9/1982 | Figge | 428/72 |
| 5,009,043 A * | 4/1991 | Kurrasch | 52/145 |

(Continued)

*Primary Examiner*—Donald J. Loney
(74) *Attorney, Agent, or Firm*—Nixon Peabody LLP

(57) ABSTRACT

A composite structure, and method of manufacturing it, having a specified width, length, and height defining a top and bottom the composite structure. The composite structure includes a three dimensional structural core constructed of a polymer with a first series of a geometric pattern repeated along its length. The structural core also has a second series of the geometric pattern repeated along the width thereof. The geometric patter may be a sinusoidal curve or a substantially pyramidal shape. The composite structure also includes a first reinforcement layer made of a polymer positioned above the structural core and bonded thereto. It also includes a second reinforcement layer made of a polymer that is positioned below the structural core and bonded thereto. The composite structure may also include a decorative layer above the first reinforcement layer, an acoustical batting layer positioned between the first reinforcement layer and the structural core, and may include fire retardant chemicals.

13 Claims, 11 Drawing Sheets

U.S. PATENT DOCUMENTS

| | | | |
|---|---|---|---|
| 5,028,474 A * | 7/1991 | Czaplicki | 428/178 |
| 5,609,942 A | 3/1997 | Ray | 428/182 |
| 5,660,908 A | 8/1997 | Kelman et al. | 478/74 |
| 5,756,182 A | 5/1998 | Landi et al. | 428/116 |
| 5,830,548 A | 11/1998 | Andersen et al. | 428/36.4 |
| 5,866,235 A | 2/1999 | Fredrick et al. | 428/182 |
| 5,894,045 A * | 4/1999 | Desrondiers | 428/178 |
| 6,004,652 A * | 12/1999 | Clark | 428/133 |
| 6,018,927 A | 2/2000 | Major | 52/793.1 |
| 6,199,342 B1 | 3/2001 | Court et al. | 52/664 |
| 6,271,270 B1 | 8/2001 | Muzzy et al. | 521/48 |
| 6,368,702 B1 | 4/2002 | Erickson | 428/292.1 |
| 6,387,967 B2 | 5/2002 | Muzzy et al. | 521/48 |

* cited by examiner

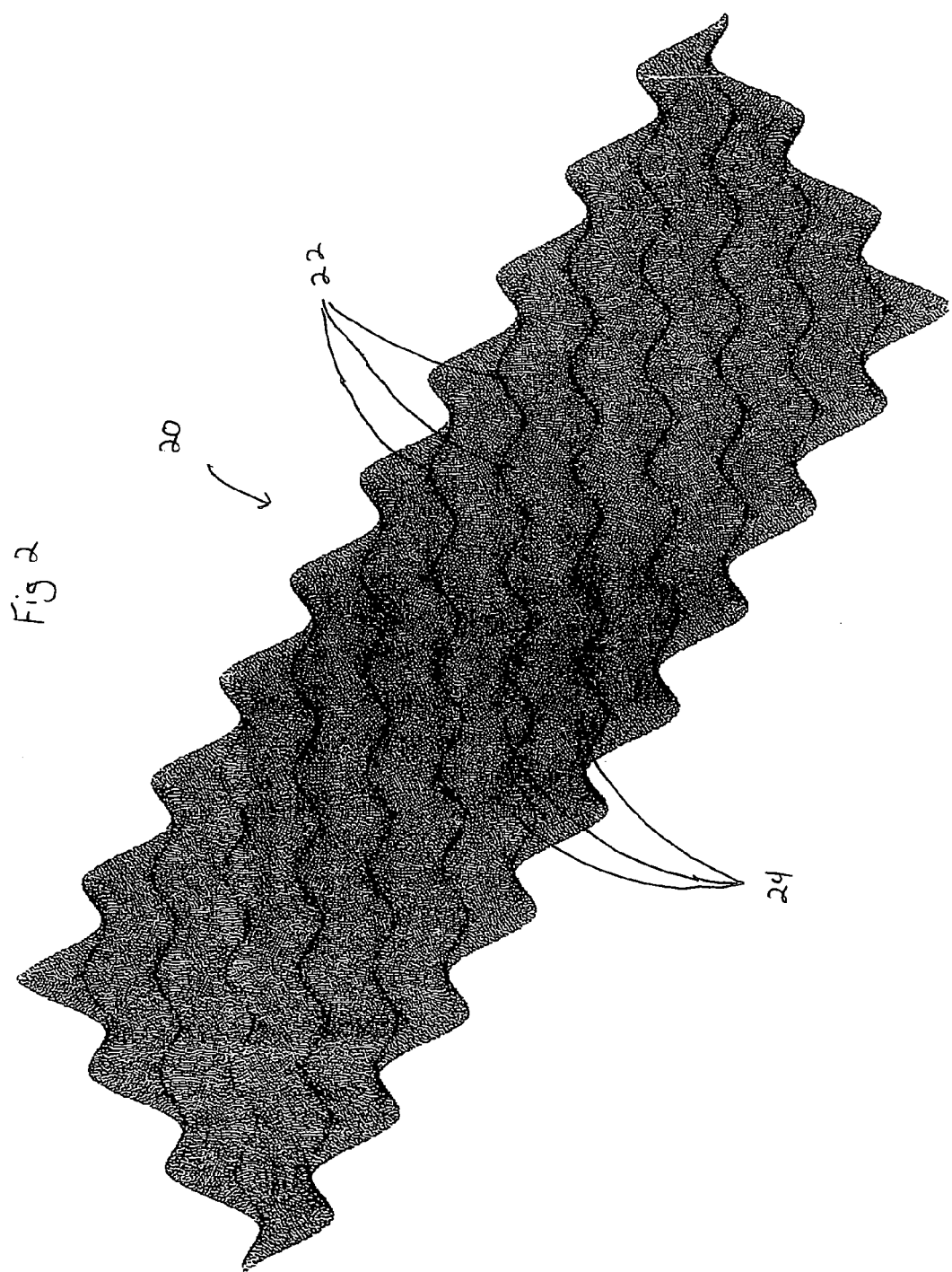

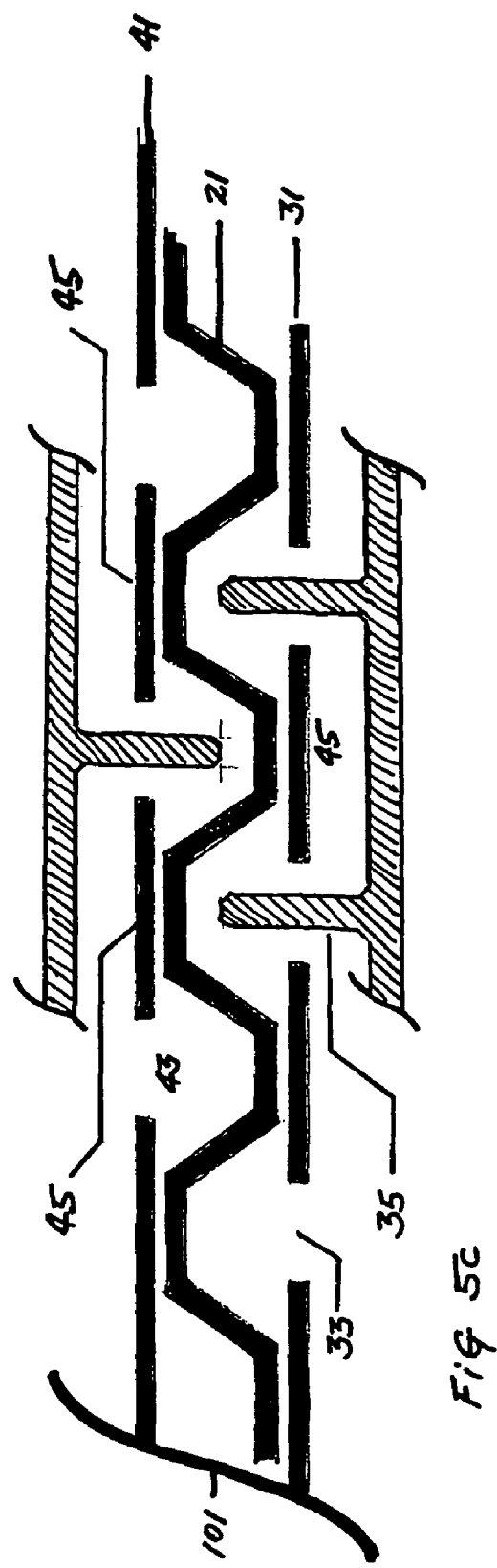

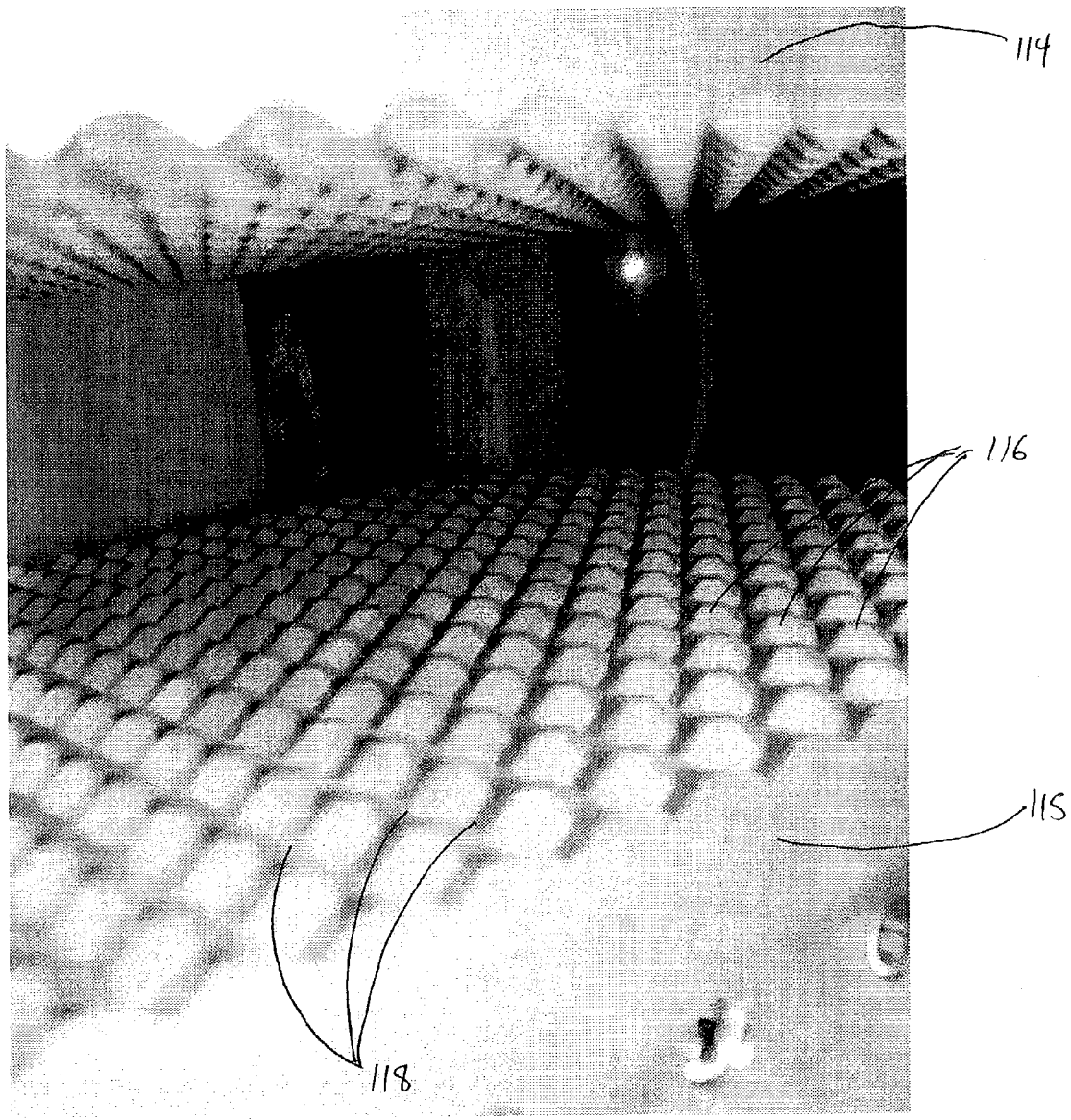

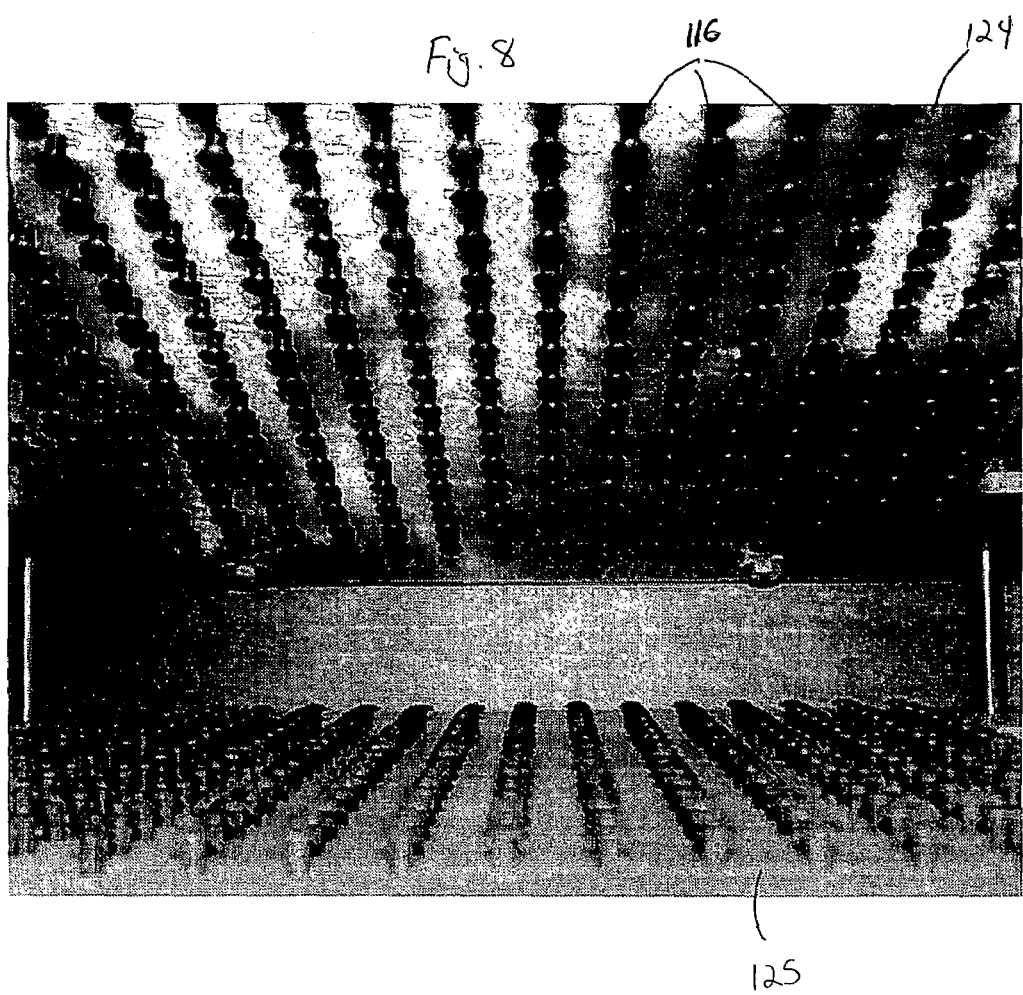

STRUCTURAL POLYMER CORE ASSEMBLY, METHOD OF MANUFACTURE AND METHOD OF USE

BACKGROUND

This application claims priority to U.S. Provisional Patent Application Ser. No. 60/352,707, filed Jan. 28, 2002.

FIELD OF THE INVENTION

Structural polymer technology has existed for many years and has been applied periodically in the automotive industry, among a myriad of other industries. A few typical applications, using the automotive industry as an example, include:
- energy absorbing countermeasures to meet Motor Vehicle Safety criteria (eg: FMVSS 201);
- glass matte (chopped fiberglass in the form of a laminar web) impregnated with thermoplastics and used in load floors and paneling;
- clamshell-type sunvisor cores;
- vacuum formed returnable packaging trays;
- underhood components, such as battery trays; and
- body components such as glass-reinforced bumpers.

A few advantages of structural polymers include:
- high dimensional accuracy;
- extremely repeatable physical properties;
- thermal stability;
- fully thermoplastic characteristics;
- completely recyclable;
- steady supply stream;
- known and repeatable processing methods;
- cost savings potential; and
- capable of being modeled mathematically to estimate mechanical, acoustical and/or thermal characteristics.

Obviously polymers are well integrated as structural components for both interior and exterior automotive applications. However, many of the existing applications today are limited from achieving full potential due to the particular processing method, polymer used, or the physical structure of the polymer itself. Injection molding, vacuum forming, and compression molding represent the primary means of processing structural polymers.

It has been discovered that a specific structural polymer core assembly is very advantageous, and superior over the prior art, for use in the automobile industry, specifically automobile interior headliners. It should be understood that while the structural assembly disclosed herein was developed specifically as automobile interior headliner, the assembly has a wide variety of other uses in other industries such as aviation, marine, building construction, office furniture, material handling, kitchen appliances, etc. Thus, while the following description will address the advantages of the structural assembly over the present technologies used in automobile headliners, it will be readily apparent to one of ordinary skill that the advantages of the structural assembly may be applicable to many industries and applications. Therefore, the following description in no way limits the scope of use of the present invention to automotive headliners.

Typically in the automobile industry, headliners are made as a composite laminate containing a plurality of layers. As seen in FIG. 1, a typical headliner may be made of the following layers from the bottom-up:
- a first non-woven scrim 2,
- a first film of polymer 4;
- a layer of chopped fiberglass 6;
- a second film of polymer 8,
- a foam core 10;
- a third film of polymer 12;
- a second layer of chopped fiberglass 14;
- a fourth film of polymer 16; and
- a second non-woven scrim 18.

The interior-facing side of the headliner is then covered with a decorative fabric for mainly aesthetic purposes. The headliner is then formed into the shape of the interior roof of the automobile for which it to be installed.

These types of headliners suffer from a number of drawbacks in that they are (1) expensive, (2) have relatively low strength, (3) tend to sag when under extreme environmental conditions for an extended period of time (i.e., they have low environmental resistance), and (4) have relatively low acoustical absorption. Also, to comply with the new Federal Motor Vehicle Safety Standards (eg: FMVSS 201), these headliners must sometimes be augmented with countermeasures after installation to provide for greater energy absorption to help prevent injury to a motorist in the case of an accident. This adds cost to the installation process.

It would thus be advantageous to provide a structural material with low cost, high strength, high environmental resistance, and high acoustical absorption that does not have to be so augmented after installation to comply with Federal safety standards.

SUMMARY OF THE INVENTION

To create the structural polymer of the present invention, a sheet of polymer, either unreinforced or reinforced with a reinforcing agent such as, but not limited to, fiberglass, is formed into a 3-dimensional structural core such as a repeating sinusoidal, pyramidal, honeycomb, or other repeating pattern as discussed in further detail below. The 3-dimensional shape formed is a series of repeating peaks and valleys. This may be accomplished in a variety of ways discussed below. The structural core is then sandwiched between two reinforcement layers that may be constructed of various materials. These reinforcement layers are preferably constructed of a material compatible with the polymer used to make the structural core to facilitate bonding between the structural core and the reinforcement layers without the addition of unnecessary external bonding agents. The reinforcement layers are preferably applied and bonded to the structural core using a double-belt laminator prior to subsequent conversion of the assembly into the final form of the construction. However, one of ordinary skill will realize the variety of ways known in the art by which this may be accomplished. For applications requiring a predominantly flat substrate, a pre-heating cycle followed by a compression cycle in a matched set of temperature regulated tooling may be employed to join the components the 3-dimensional structure. A batting layer may be sandwiched between the structural core and the reinforcement layers filling the gaps created when the structural core was formed. Other reinforcing and decorative layers may be applied to the resulting composite.

BRIEF DESCRIPTION OF DRAWINGS

A more complete understanding of the method, apparatus, and article of manufacture of the present invention may be obtained by reference to the following detailed description when taken in conjunction with the accompanying Drawings wherein.

DETAILED DESCRIPTION

Figure 2:
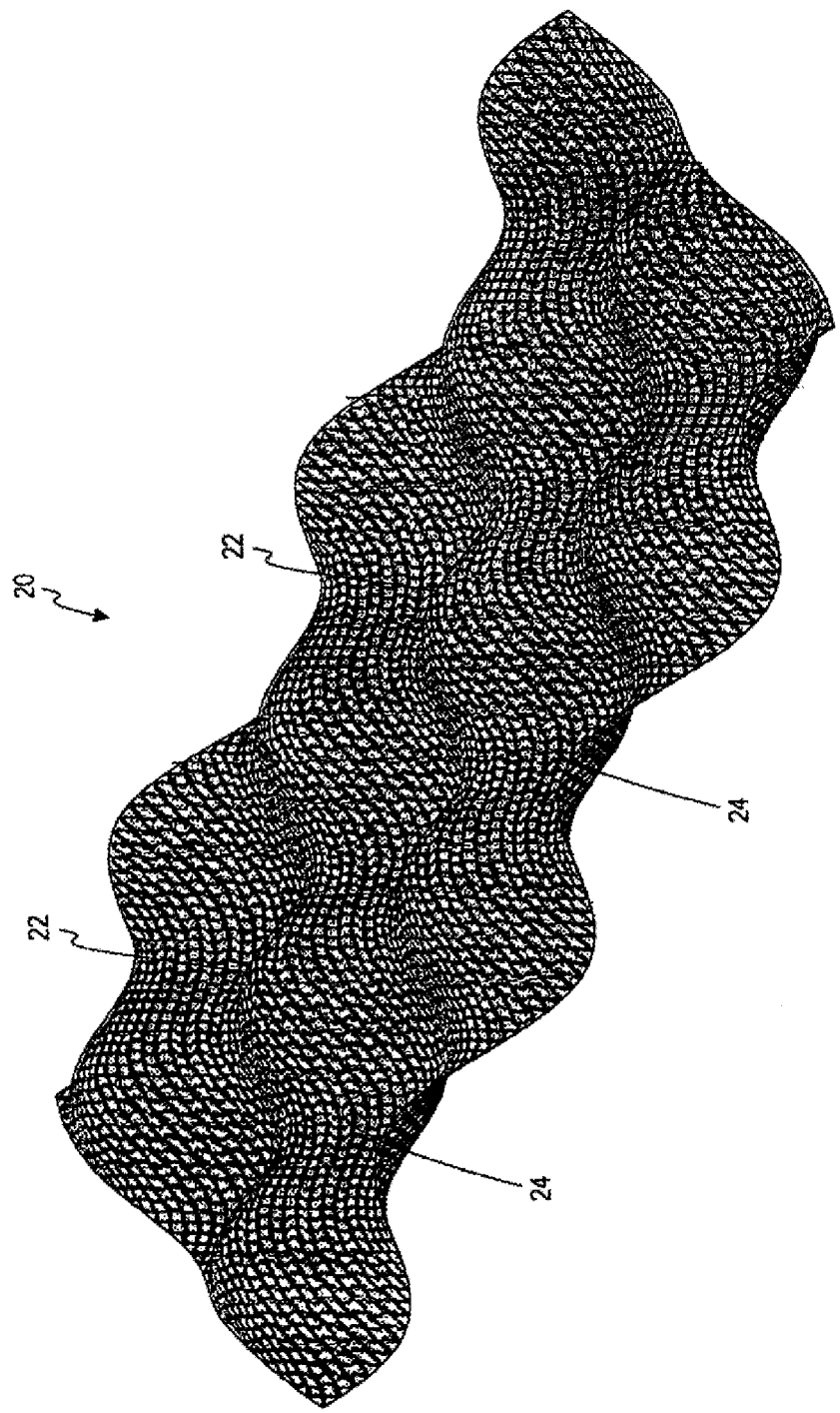
FIG. 2 is a perspective view of one embodiment of the structural core of the present invention.
Figure 3:
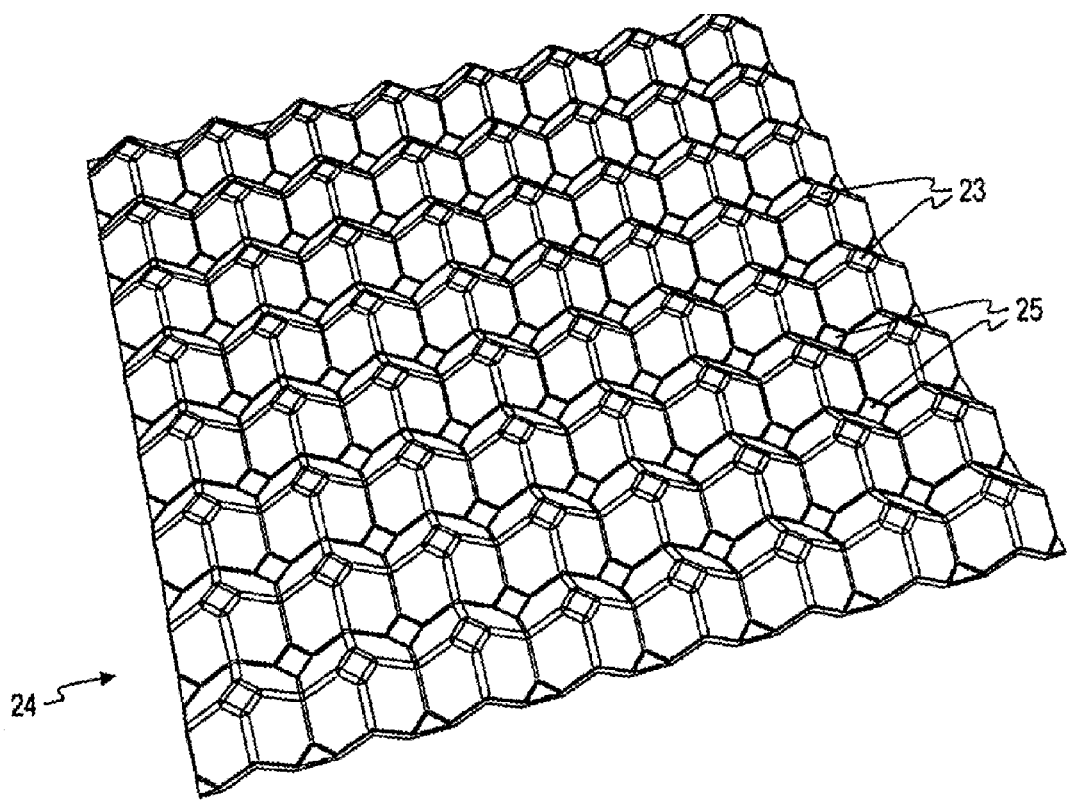
Figure 4:
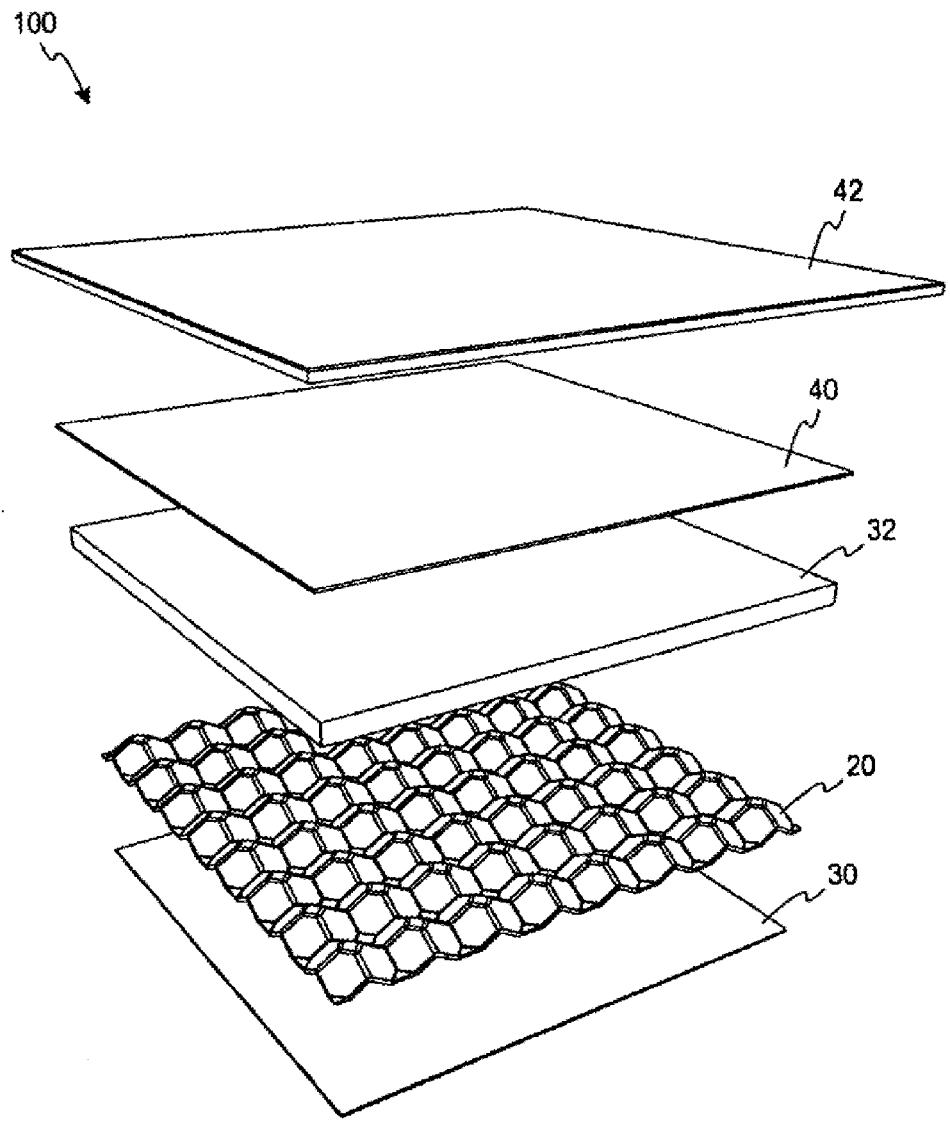

Referring now to FIG. 2, a perspective view of one embodiment of the structural core 20 of the present invention is shown. The structural core 20 is formed of a pattern of repeating geometries forming peaks 22 and troughs 24. In this illustration, the repeating geometries formed are sinusoidal curves. The actual measurements and properties of the structural core 20 are driven by various design parameters such as mass, compressive strength, acoustical behavior, environmental resistance, core target cost at nominal thickness, etc. Thus, by varying the thickness, geometry, and material of the structural core 20, one can optimize the various design parameters associated therewith. Various base materials considered for the structural core 20 for use in the automobile headliner industry are: (1) a fiber-reinforced recycled thermoplastic composite as disclosed in U.S. Pat. No. 6,271,270 B1; (2) a fiber-reinforced recycled thermoplastic composite as disclosed in U.S. Pat. No. 6,387,967 (3) polypropylene; (4) polyethylene terephthalete; (5) polyamide (nylon); (6) thermoplastic polyolefin; and (7) high density polyethylene. Reinforcing fibers, such as fiberglass, natural fiber, monofilament polymer, and P.E.T. fiber, may be employed within the base material for reinforcement purposes.

In addition to the criteria outlined above, additional design guidelines may be used or targeted once the initial geometry is established such as:

- interval of repeating pattern;
- nominal core weight/area;
- nominal core height or effective core thickness;
- minimum contact area with reinforcement layers at peak of geometry;
- maximum draw angle;
- resin type (for applicable material); and
- maximum reinforcement fiber length (for applicable materials).

There are inherent benefits to using a structural core 20 which is 3-dimensional as compared to just a flat sheet of polymer such as: (1) lower density; (2) higher strength to weight ratio; and (3) greater acoustical absorption potential (due to the greater surface area and the non-perpendicular reflections of incident sound waves and the abatement associated with them). These inherent benefits would apply to any structural core design in which a geometry is rendered which comprises a vast majority of air and only a small volume of polymer (or composite). When the structural core is designed appropriately and efficiently, and when it is combined with appropriate reinforcing layers, as in the examples herein proposed or as in more traditional honeycomb structures, tremendous strength and flexural modulus can be achieved. The additional advantage of forming such a geometry from an initially flat thermoplastic sheet in a relatively simple process is that such a construction will have significantly lower cost of assembly than traditional means of employing extruded or heat-staked honeycombs or adhesive-bonded honeycomb structures.

Figure 1:
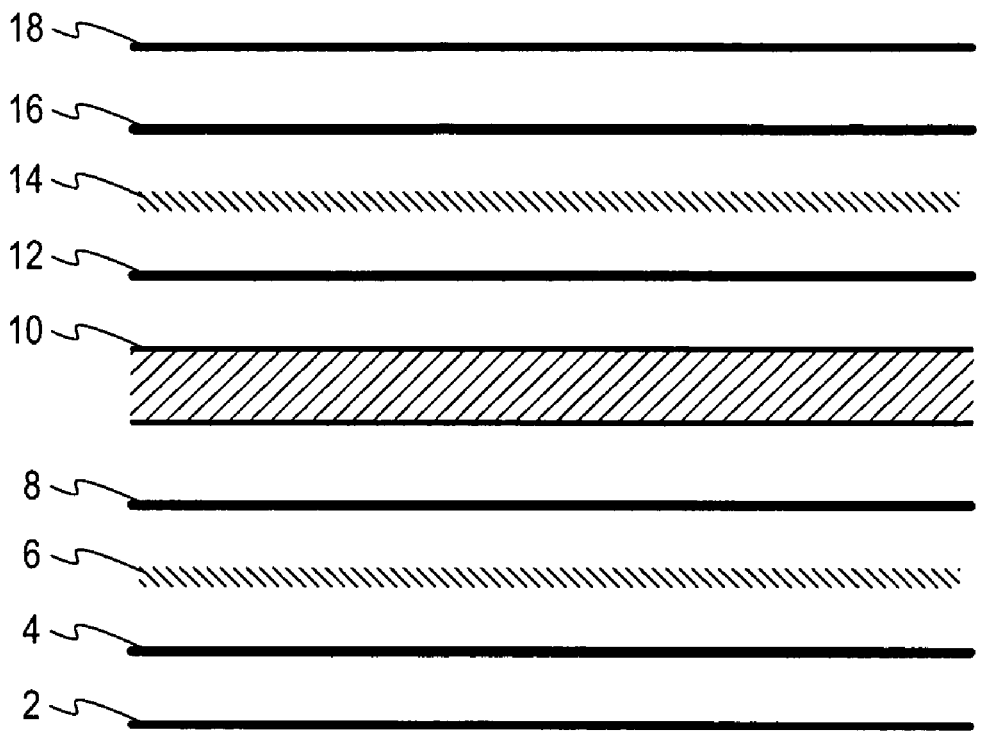
FIG. 1 is a side elevational exploded view of a typical headliner composite.
Figure 3:
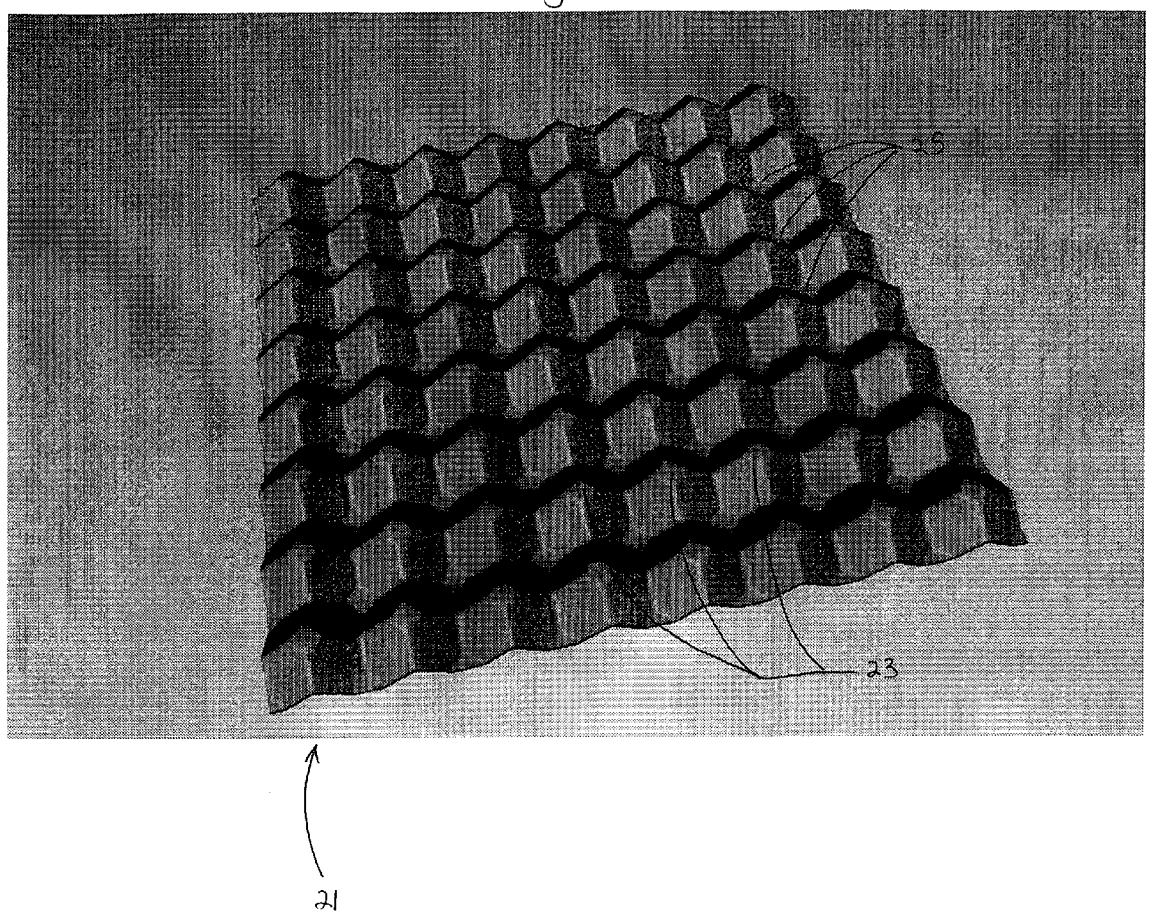
FIG. 3 is a perspective view of one embodiment of the structural core of the present invention.

Referring now to FIG. 3, there is shown a perspective view of one embodiment of the structural core 21 of the present invention. The structural core 21 is formed of a pattern of repeating geometries forming peaks 23 and troughs 25. In this embodiment, the repeating geometries formed are modified pyramidal shapes that are characterized by a unique symmetry which facilitates the production of such features in an initially flat thermoplastic sheet. In order to provide sufficient contact area for bonding between the structural core 21 and any reinforcement layer, the peaks 23 and troughs 25 have flat tops and bottoms. In order to reduce stress concentration factors and assist in compression forming, appropriate radii have been assigned to the areas of the geometry where oblique edges join each other. It has been found that the particular geometry of the structural core 21 of FIG. 3 has excellent acoustical absorption properties in the 500-2000 HZ range. Other geometries may be used for the structural cores 20, 21 such as egg-crate shapes, a honey-comb pattern, etc.

Figure 4:
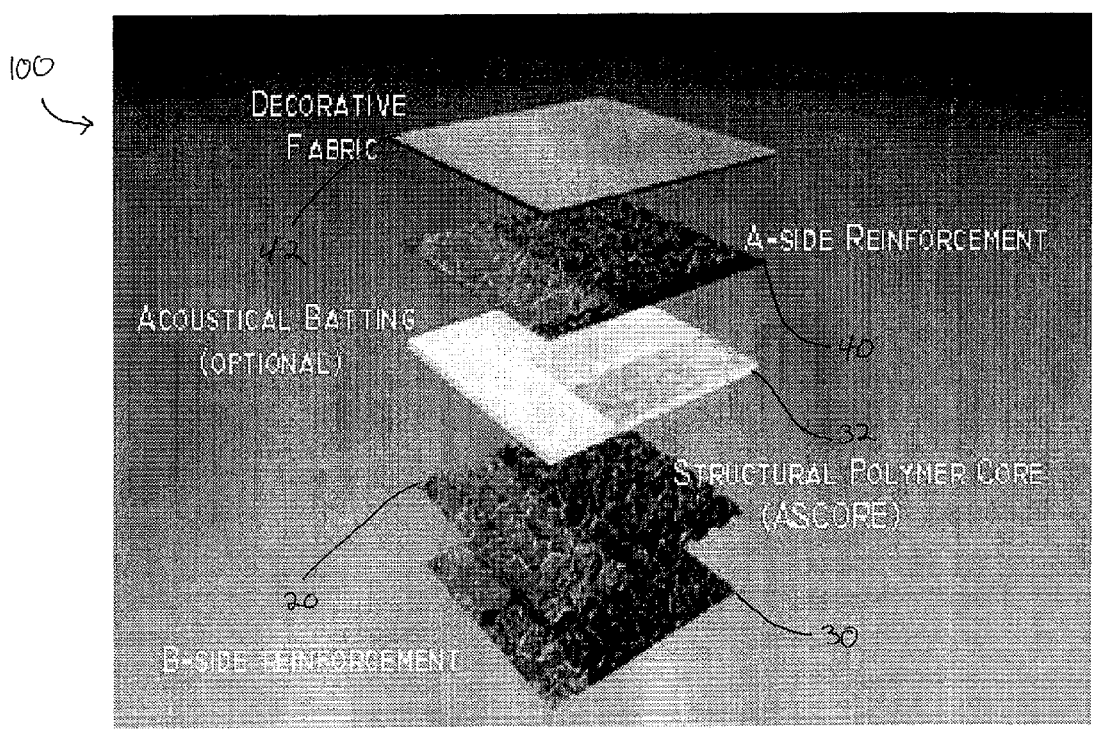
FIG. 4 is a perspective exploded view of a structural polymer core assembly of the present invention.

Referring now to FIG. 4, there is shown a perspective exploded view of the structural polymer core assembly 100 of the present invention. To provide stability of the structural polymer core assembly 100, the structural core 20 is sandwiched between reinforcement layer 40 and reinforcement layer 30. In order to provide for additional acoustical absorption, acoustical batting 32 may be sandwiched between the reinforcement layer 40 and the structural core 20. Similarly, acoustical batting 32 may also be placed between reinforcement layer 30 and structural core 20. For aesthetic purposes, the outside of reinforcement layer 40 may be covered with decorative fabric 42. To allow for good bonding between the structural core 20 and the reinforcement layers 40, 30, the reinforcement layers 40, 30 should be constructed of a material compatible with the material of the structural core 20. It should be noted that dissimilar materials may also be employed if necessary but may require the introduction of an adhesive layer or other bonding agent.

Figure 5A:
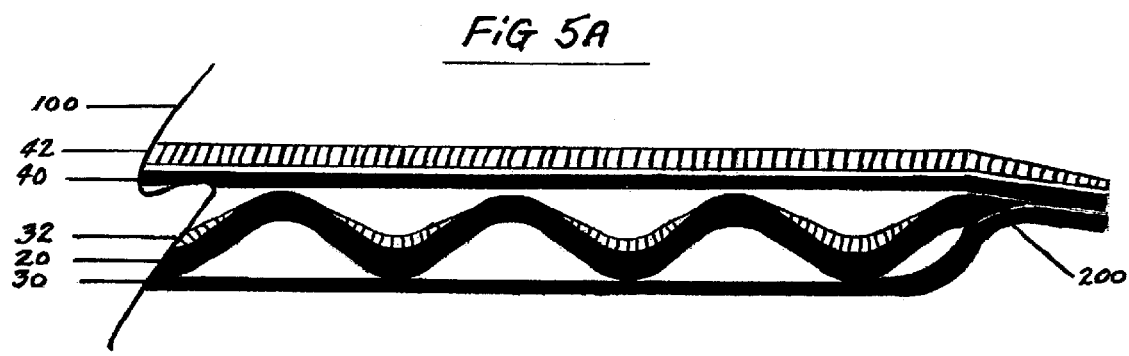
FIG. 5A is an elevational cross sectional view of the structural polymer core assembly of FIG. 4.

Still referring to FIG. 4, due to the nature of the structural polymer core assembly 100, a specific three step process can be employed to create it, however, in actuality a plurality of methods exist to produce said assembly. In the specific three step process referred to, a flat sheet of polymer (optionally reinforced polymer) is first pre-formed into a 3-dimensional structural core 20 of substantially uniform thickness. Methods of pre-forming the structural core 20 will be discussed in further detail below, and like the structural polymer core assembly 100, the structural core 20 can be created using several various methods. The second step in the assembly process is to create a flat composite which incorporates the structural core 20 between two reinforcement layers 40, 30. This composite may be laminated using a double belt laminator. The resulting composite would have substantially uniform thickness and would resemble the basic design for FIG. 5A. Another embodiment and method would be to fuse the core 20 to the reinforcement layers 40, 30 by applying local heating or welding at predetermined locations 34, 44 in the form of a conductive heat mandrill, vibration or sonic welder, or other similar thermoplastic fusing means as generally illustrated in FIG. 5C. The final step is to preheat the composite in a convection or radiant style oven, soak the materials at a temperature to achieve the proper forming properties, add decorative fabric 42 to the outside of reinforcement layer A 40, and index the structural polymer core assembly 100 into a cool forming tool which molds the assembly into the shape of a particular finished composite structure Referring again to FIG. 5A, there is shown an elevational cross-sectional view of a structural polymer core assembly 100 of FIG. 4. To provide stability, the structural core 20 has been sandwiched between two reinforcement layers 30, 40. To provide for increased sound absorption, a layer of batting 32 has been sandwiched between the structural core 20 and the reinforcement layer 40. For aesthetic purposes, the outer surface of the reinforcement layer 40 has been covered with decorative fabric 42. After forming, the structural polymer core assembly 100 may be formed into a particular shape depending on the application for which it is intended. For example, the structural polymer core assembly 100 may be drawn into the shape of an automobile headliner. When a headliner is formed, the structural core 20 of the structural polymer core assembly 100 in the drawing area 200 may collapse somewhat into a more flat geometry. The 3-dimensional structural core 20 geometry allows for more "give" in the core material and allows for a deeper draw than that of flat polymer made of the same material and of the same thickness. A geometrical structural core 20 pre-formed sheet can replace more expensive or undesirable materials such as urethane foam, resinated fiberglass, or cardboard (materials typically used as core materials in headliners and other decorative substrates with either structural or functional requirements). The structural polymer core assembly 100 illustrated has several features that are evident from the illustration. First, air cavities between structural core 20 and reinforcement layer 30 allow entrapment and absorption of incident sound. Second, the bond between structural core 20 and reinforcing layers 30, 40 requires no additional adhesive, when these materials are selected in such a way that they are compatible Third, the 3-dimensional structural core 20 construction offers transverse strength as compared to typical headliners used in the industry.

Lastly, with the advent of new and more strenuous motor vehicle safety regulations (e.g. FMVSS 201), additional requirements have been added to the functionality and purpose of a headliner module. The requirement that appears to have changed the design of a typical headliner the most is the head-impact requirement. This regulation imposes a minimum acceptable energy absorption capability upon the headliner in specific target zones. Traditional methods of reaching this minimum level of absorption have required extensive counter measures, typically applied after forming, to the rear surface of the substrate. This process is costly, labor intensive, and requires additional packaging space within the vehicle cockpit. The concept of a structural polymer core assembly 100 not only addresses the traditional requirements of an automobile headliner, but also promises to help address the issue of energy absorption. Due to its geometry, a structural core 20 would naturally absorb energy at a very efficient rate and level. This is due to the collapsing of the 3-dimensional shapes without rebounding when an impact force is applied.

A significant capability related to these four features is the simulation of design and mathematical modeling that can validate such properties in relationship to one another prior to prototyping of the actual structure. A design whose properties can be estimated, analyzed and/or optimized mathematically promises a great advantage over traditional methods of designing composite structures employing core materials such as urethane foam or cardboard which are by nature have much greater variations than do polymers of known and repeatable physical properties. The inherent design of a predictable structure can lead itself to efficient analysis and design enhancement as will be described in greater detail below.

Figure 5B:
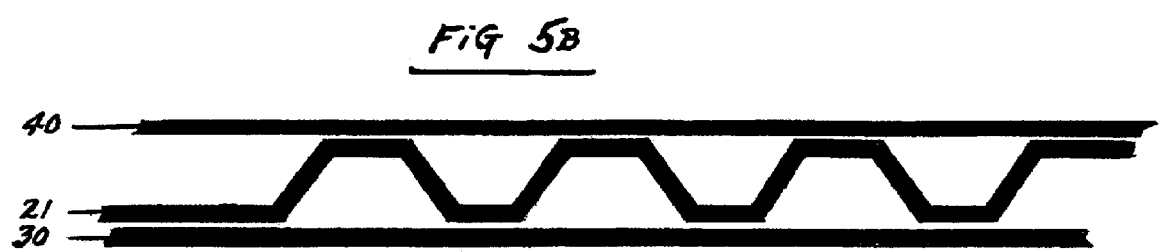
FIG. 5B is an elevational cross sectional view of a structural polymer core assembly concept employing the structural core of FIG. 3.
Figure 5A:
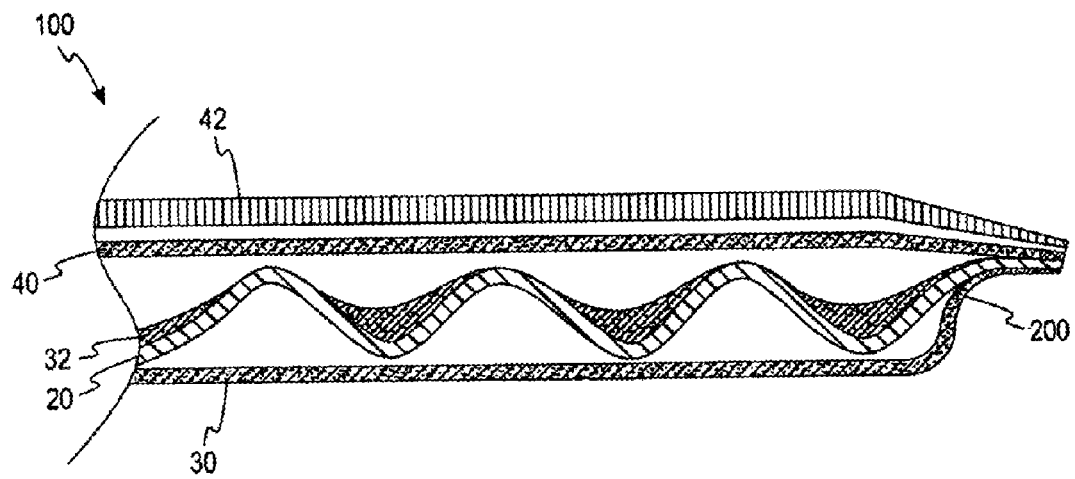
Figure 5B:
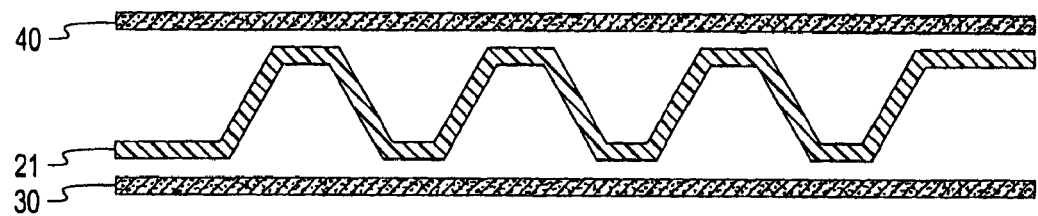
Figure 5C:
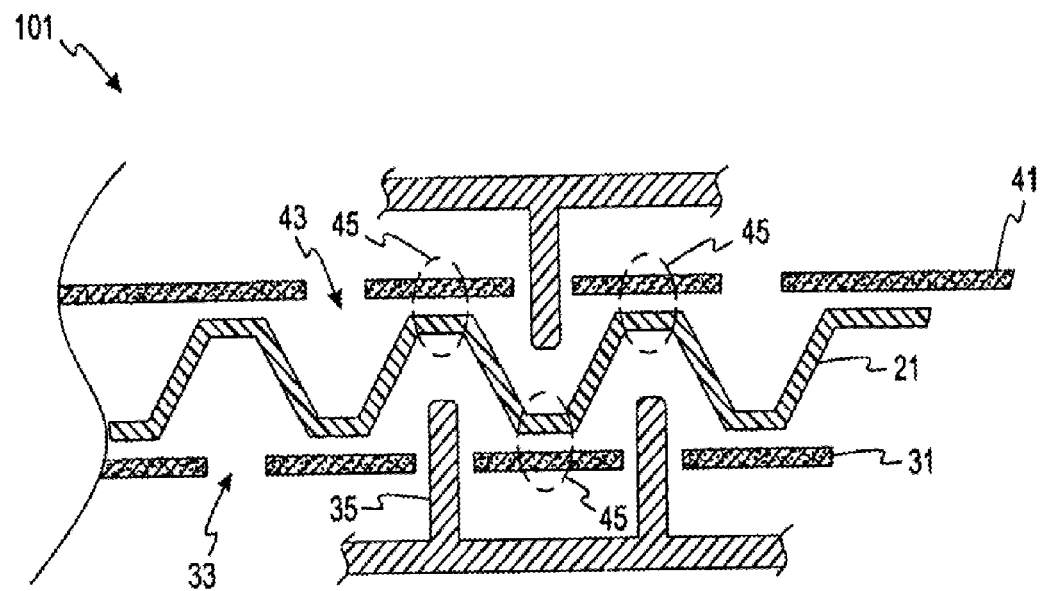
FIG. 5C is an elevational cross sectional view of an alternative embodiment of a structural polymer core assembly employing the structural core of FIG. 3.
Figure 6:
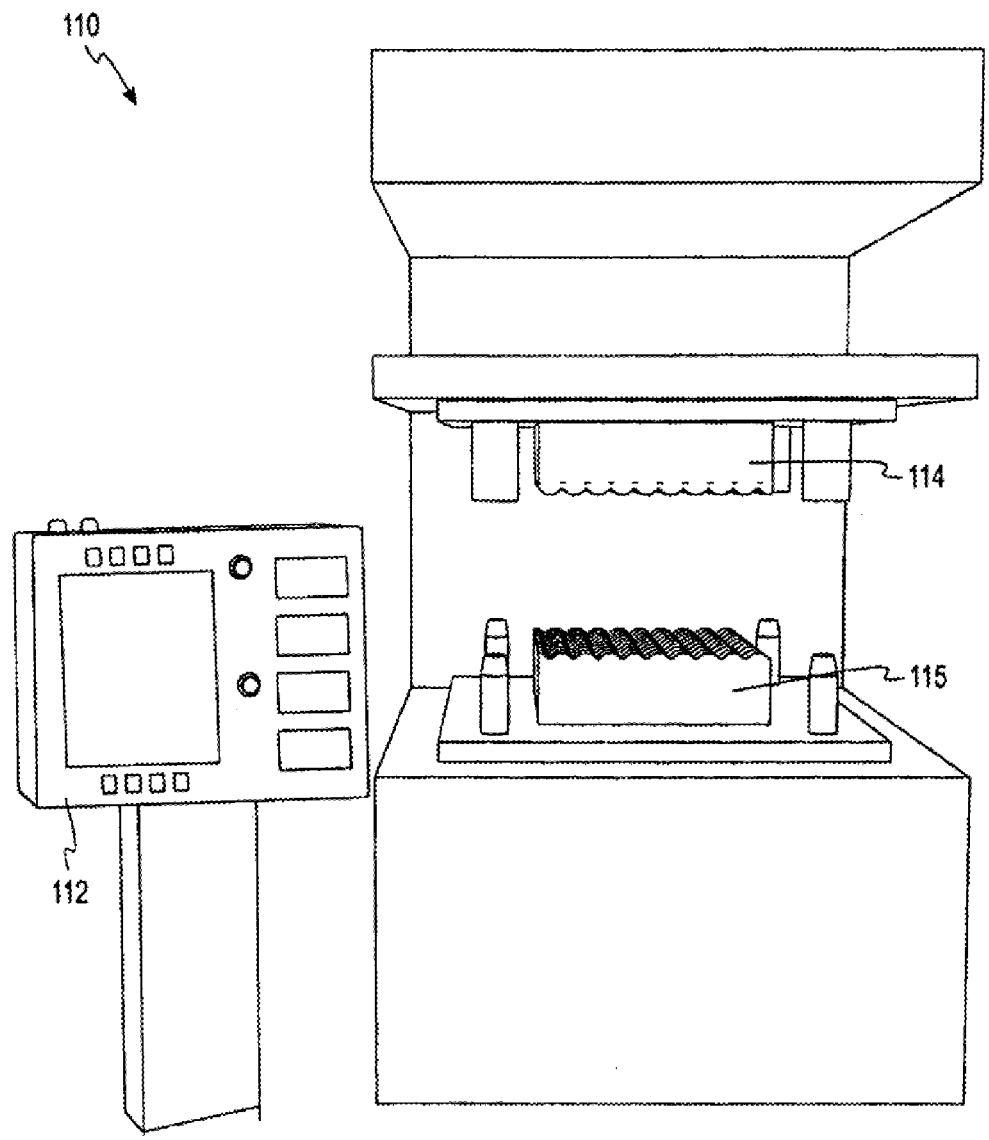

Referring now to FIG. 5B, an elevational cross sectional view of a structural polymer core assembly 100 employing the structural core 21 of FIG. 3 is shown. The embodiment here depicted is a simple three layer assembly consisting of the structural core 21 of FIG. 3, sandwiched between reinforcement layers 30 and 40. As stated above, optional acoustical batting may be used between either reinforcement layer 30, 40 and the structural core 21. Also, a decorative fabric may be added to the outside surface of either reinforcement layer 30, 40.

Referring now to FIG. 5C, an elevational cross sectional view of an alternative embodiment of a structural polymer core assembly 101 employing the structural core 21 of FIG. 3 is shown. Structural polymer core assembly 101 is similar to the structural polymer core assembly 100 of FIG. 5B except for openings 33 and 43 spaced throughout the planar surface of the reinforcement layers 31 and 41, respectively. Openings 33 and 43 allow heated mandrills 35 to pass through openings 33 and 43 and apply heat and pressure to area 45 where the structural core 21 comes into contact with reinforcement layers 31 and 41. When heat and pressure is applied to area 45, structural core 21 bonds to reinforcement layers 31 and 41 without the aid of an adhesive or other bonding agent (as long as the material of the structural core 21 is compatible with the materials of the reinforcement layers 31 and 41). The openings 33 and 34 also function to help the structural polymer core assembly 101 operate to function as a sound absorption structure.

Figure 6:
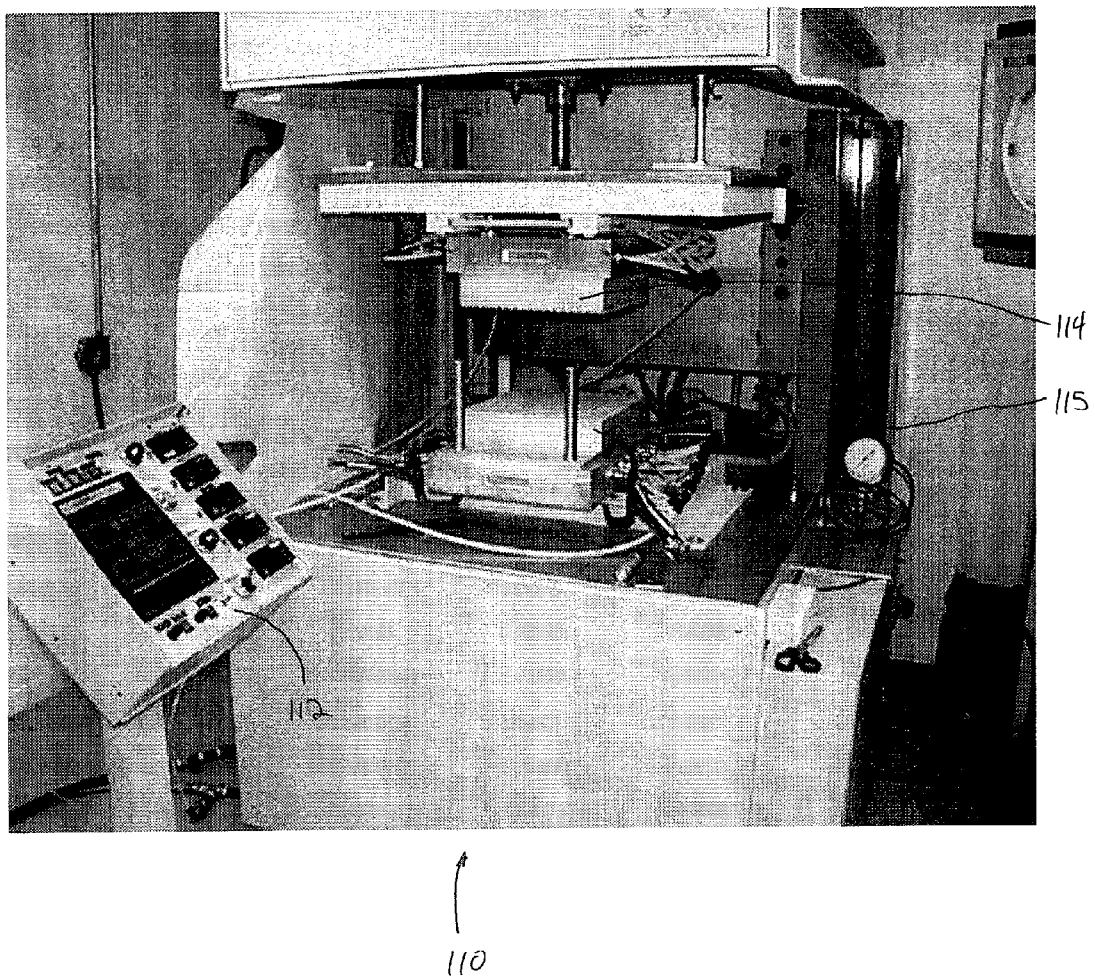
FIG. 6 is a perspective view of a molding machine that may be used to form the structural core of the structural polymer core assembly.

Referring now to FIG. 6, there is shown a perspective view of a molding machine 110 that may be used to form the structural core 20 of the structural polymer core assembly 100. To form the structural core 20, a flat piece of polymer (which may be fiber reinforced) is initially pre-heated using radiant or convective means and subsequently placed between plates 114, 115 that are preheated to a temperature specified at the control panel 112. The plates 114, 115 are then brought together compressing the flat piece of polymer into the 3-dimensional shape of the structural core 20. The amount of compressive force on the plates 114, 115 and the length of time they are brought together are controlled at the control panel 112. The plates 114, 115 remain together for a period of time long enough for the polymer to cool adequately and produce a structurally sound structural core 20.

Figure 7:
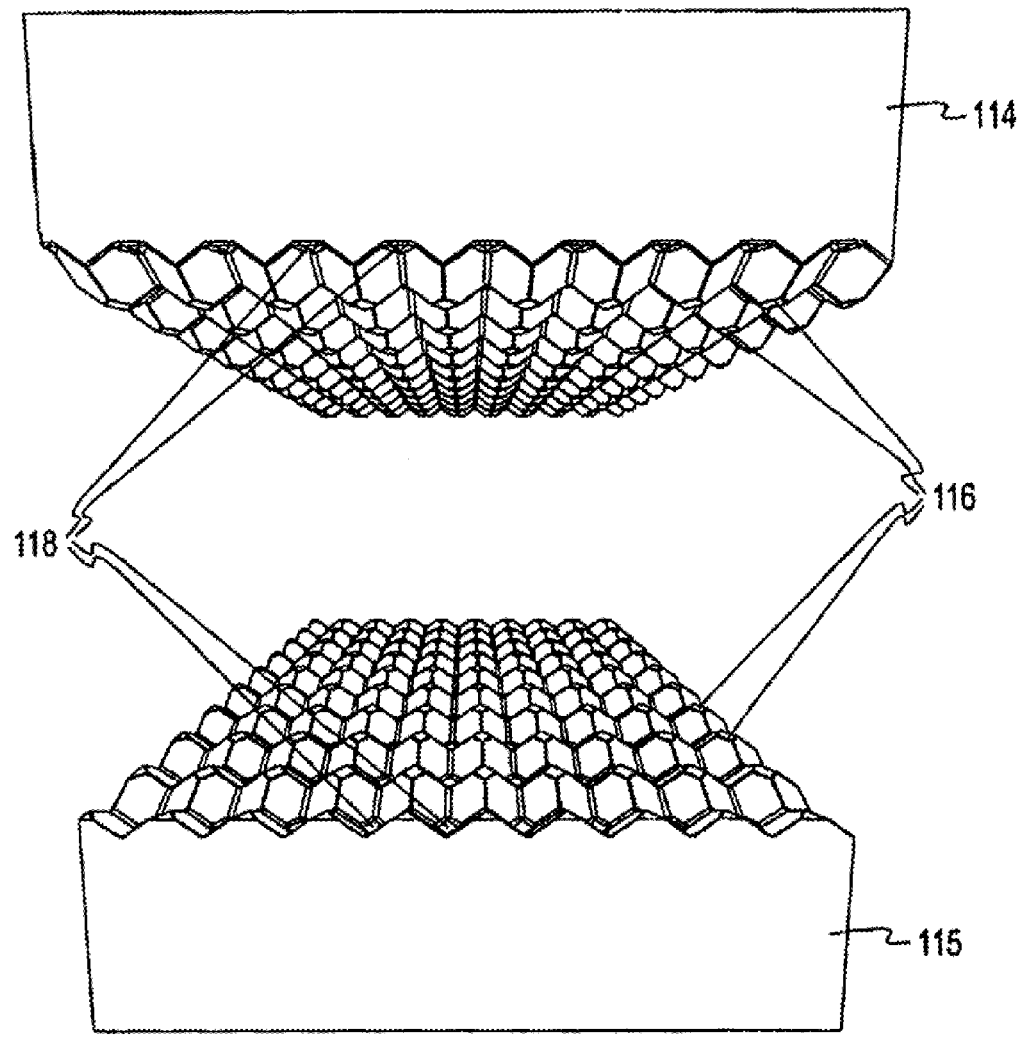
FIG. 7 is a perspective view of the plates of the molding machine illustrated in FIG. 6.

Referring now to FIG. 7, there is shown a perspective view of the plates 114, 115 of the molding machine 110 of FIG. 6 illustrating the surface geometry of the plates 114, 115 used to form the structural core 21. As is evident from FIG. 7, the interior surfaces of the plates 114 and 115 mate to form the specific geometrical pattern of the structural core 21. To form the peaks 23 and troughs 25 of the structural core 21 (see FIG. 3), the plates 114, 115 have corresponding peaks 116 and troughs 118 on their interior surfaces. The plates 114, 115 illustrated are of a geometry to form the pyramidal structural core 21 of FIG. 3. Such geometry has been designed to allow a natural nesting of upper plate 114 with lower plate 115. This nesting is critical to the symmetry of the resultant formed structural core 21 about its neutral axis and will allow a clear understanding of the anisotropic mechanical properties in structural core 21.

Figure 8:
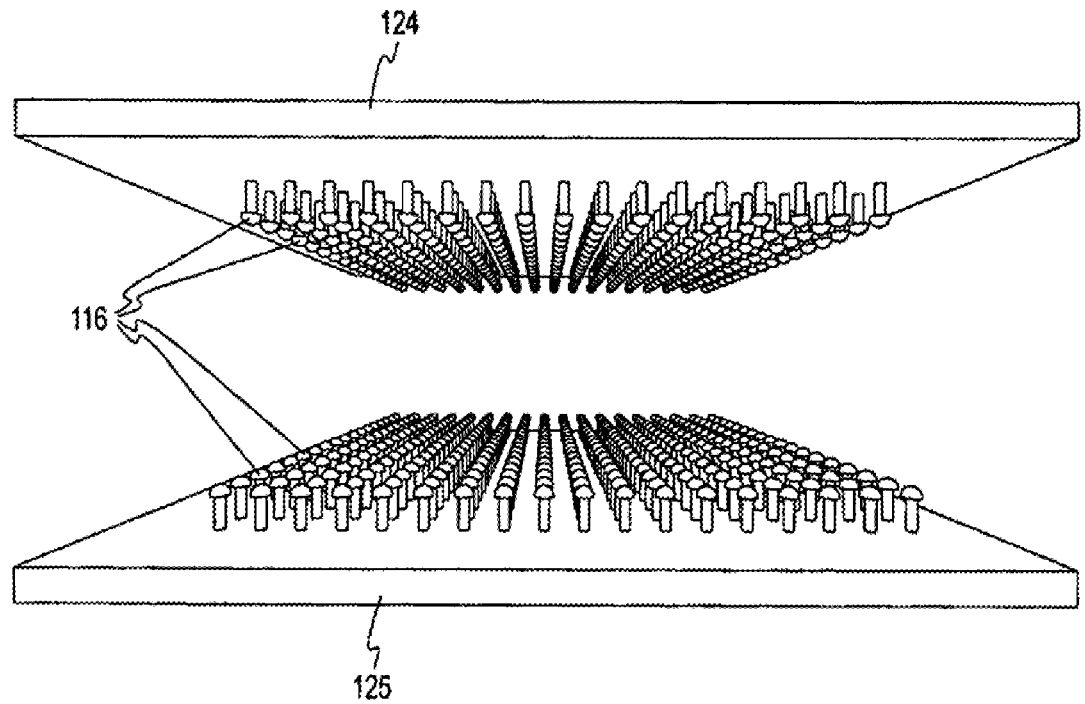
FIG. 8 is a perspective view of alternate plates of the molding machine illustrated in FIG. 6.
Figure 9:
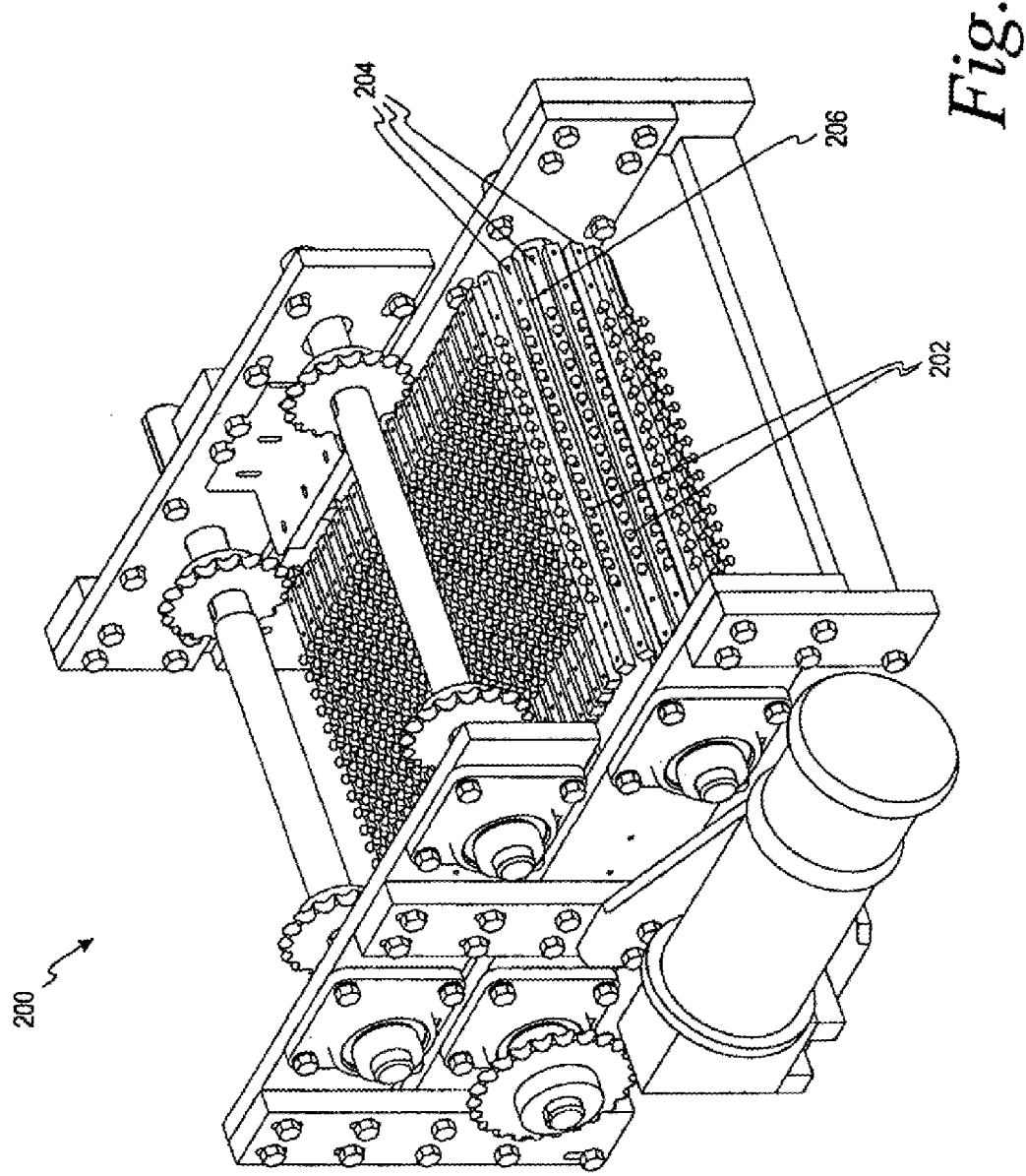

Referring now to FIG. 8, there is shown a perspective view of alternate plates 124, 125 of the molding machine 110 illustrated in FIG. 6. These plates 124, 125 are configured to generate the sinusoidal-type structural core 20 illustrated in FIG. 2. To generate the sinusoidal-type geometry, the peaks 116 of plates 124, 125 are rounded to form the peaks 22 and troughs 24 of the structural core 20. Any number of plates 124 and 125 with different geometries may be used to generate a wide variety of structural core shapes.

Figure 9:
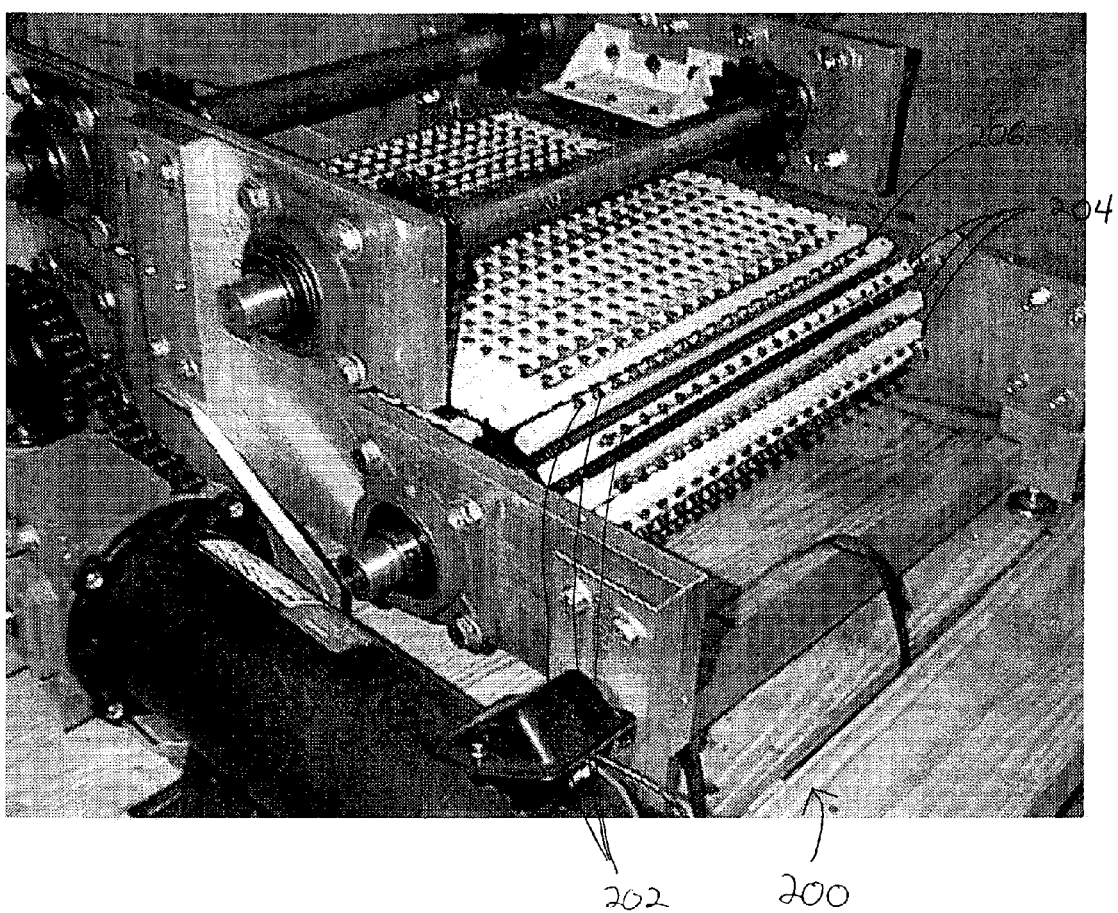
FIG. 9 is a perspective view of a continuous structural core forming machine used to create the structural core of FIG. 2.
Figure 1:
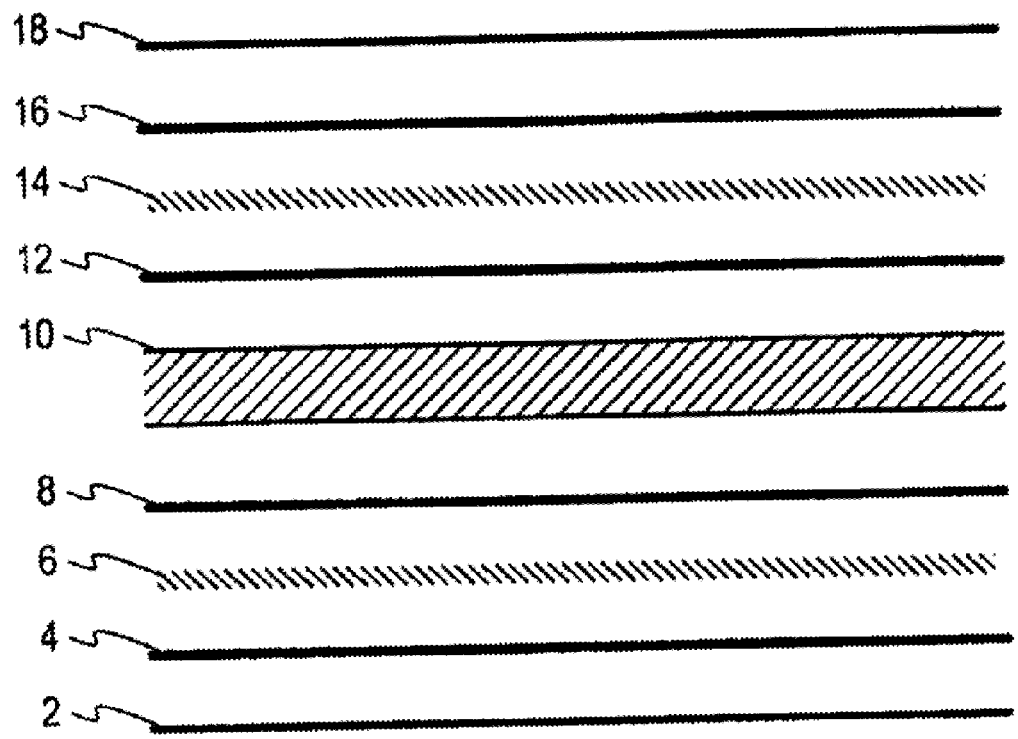

Referring now to FIG. 9, there is shown a perspective view of one embodiment of a continuous structural core forming machine 200 used to create the structural core 20 of FIG. 2. To continuously form a structural core 20 (not shown), a flat piece of polymer (which may be fiber reinforced) is initially preheated and then placed between two opposing belts 206 (note that only one belt is illustrated in FIG. 9) which contain the appropriate forming geometry. Each belt 206 contains rows 204 of raised areas 202 that intermesh with the raised areas 202 of the opposing belt 206 (not shown). As the belts move, the piece of polymer is drawn down the belt while being formed into the predetermined shape of the structural core 20. The continuous structural core forming machine 200 may have heating zones to bring the polymer to the proper forming temperature, or, alternatively, the material may be preheated in an oven, or the like. Similarly, the continuous structural core forming machine 200 may have a cooling zone to bring the formed structural core 20 to a temperature such that it is structurally sound when coming off the continuous structural core forming machine 200. The continuous structural core forming machine 200 illustrated in FIG. 9 is configured to form the structural core 20 of FIG. 2, however, by varying the geometry of the raised areas 202, the continuous structural core forming machine 200 can easily be configured to form structural cores with a variety of geometric patterns.

In addition to the method for continuously forming the structural polymer core as illustrated in FIG. 9, a few additional methods are conceived. In one such method, specialized rollers are created with specific surface geometry design to nest with one another in much the same way meshing gears would join. The polymer sheet (which may be reinforced) is initially preheated and then introduced into the 3-dimensional meshing area of the mating rollers. The rollers would serve to consolidate the shape by virtue of the application of compression and controlled cooling. Other methods for continuously forming said polymer core include a vacuum thermoforming process and an air bladder blowing process.

Once the structural core 20 is pre-formed, it can then be laminated into a pre-applied composite sandwich to form sufficient bond strength between the various layers of the structural polymer core assembly 100 and to assist handling during the final forming step. Lamination of composite layers is standard procedure for producing automotive headliners of the dry thermoplastic type whether the cores are made of semi-rigid foam, polyethylene terephthalete, or some variant of glass-matte thermoplastic, etc. Lastly, the structural polymer core assembly 100 is formed into the shape of a headliner using heat and pressure, a process very well known in the art.

Previously, automobile interior trim (such as headliners) have not been historically developed using computer aided design such as finite element analysis. One reason for this is that the materials used in constructing the "old" interiors had variable properties due the types of materials used in their construction. Urethane foam or fiberized nonwovens are irregular and difficult to model theoretically. Large material variations exist making it very difficult, if not impossible, for a computer to predict material behavior analytically (such as compressive strength, transverse bending values, acoustical behavior, etc.). Through the use of computer simulation, materials with consistent properties, and the variation of structural core 20 geometry, engineers can actually tailor a polymer structural core geometry to:

attenuate specific frequencies of sound;
deflect to known amounts in quantifiable ways;
withstand various environmental conditions; and
absorb a particular amount of impact energy.

Not only does one have the capability to develop an intelligent design, but one can also create and analyze numerous virtual designs analytically with the use of design analysis software. This can be done at a fraction of the cost, a fraction of the time, and with greater accuracy than the traditional "trial and error" method.

By its very nature, a structural polymer core assembly like the one described herein can be a building block and/or modular component of larger system when integrated into appropriate applications. Attributes of the design which validate this statement include its structural integrity, theoretical capabilities to abate unwanted noise, high strength-to-weight ratios, low relative cost, simplicity of construction and efficiency of design as well as other features aforementioned. Several specific methods of utilizing the structural polymer core assembly in the interest of realizing the previously mentioned attributes will be described in detail in the following paragraphs.

Due to the stringent yet diverse requirements of automotive interior components, materials and structures are required which represent an optimization of such important characteristics as, for example, flexural strength and acoustical absorption. Often the composition of a structure that has strong mechanical properties must sacrifice some level of acoustic damping and vice versa. When impact absorption, cost, and manufacturing feasibility are added to the list of requirements, it is apparent that automotive interior component design relies upon a vast balance and prioritizing of key attributes. For this and other reasons, the structural polymer core assembly 100, 101 appears to address such optimization considerations quite well. For example, the structural polymer core assembly 100, 101 could be integrated into an automobile in the following ways: as a headliner, a "package tray" (or speaker shelf), the substructure of a visor, a cargo area or trunk load floor, a seat back or door bolster reinforcement, a console tray, etc.

Unlike the automotive interior example, building constructions applications are typically more strictly concerned with mechanical properties of the building materials in addition to their cost. A structural polymer core assembly 100, 101 could be designed to share many of the same functional properties as are common to materials like plywood or particle board. Certain manifestations of the design may even satisfy the requirements of structural elements made out of lumber. As such, the structural polymer core assembly may be used for decking, roofing, walls for buildings or vehicles, supporting concrete during the pouring and curing steps as in a wall of concrete. Additionally said assembly could be integrated into material handling components such as pallets and containers.

It is thus apparent that the structural polymer core assembly 100, 101 could serve the function as the structure inside a door. It would meet the mechanical requirements of such an application, while adding the capability of acoustical and thermal insulation, as well as efficiency of design and cost.

Marine applications require yet another set of optimized performance characteristics to which the structural polymer core assembly 100, 101 seems well suited. Among these are salt and corrosion resistance, buoyancy, thermal insulation by virtue of either entrapped air or the introduction of specialized insulators into the structural polymer core assembly 100, 101, and environmental stability. The assembly could serve as a portion of the decking of a boat, or a component of the substructure, or as an insulator for a marine vehicle engine, or separately as a component of a dock or pier. In addition to external marine applications, it is readily apparent that the attributes of the structural polymer core assembly 100, 101 that make it well disposed in meeting the requirements of an automotive interior would thus satisfy similar requirements of certain aspects of a marine vehicle interior.

Aircraft applications are obviously concerned with strength-to-weight attributes and the efficiency of utilizing light materials that will perform in an environment typical of an aircraft. Again it is clear that the structural polymer core assembly 100, 101 could be so designed and manufactured to meet the requirements of such aircraft applications as the following: a drink tray capable of being stowed, certain components of a drink cart such as the sides and substructure; certain components of storage areas such as the overhead bins, elements of the galley, luggage compartment or lavatory, as a component in bulkhead walls or privacy partitions. Additionally, given the appropriate design a structural polymer core assembly 100, 101 could serve to function as an element of an aircraft flooring.

Kitchen appliances or other kitchen applications may also require properties that may be met with a structural polymer core assembly 100, 101. Examples include components of appliance surfaces and structures where reinforced cores are prevalent, shelving, and as a structural component within countertops and cabinetry. Additionally, if the structural polymer core assembly 100, 101 (the core and the reinforcement layers) is comprised of a metal such as aluminum or stainless steel, it may even meet the requirements of a cooking surface as in a cooking sheet by allowing a more even heating of the surface than a flat sheet would otherwise permit.

Applications whereby the structural polymer core assembly 100, 101 could meet the needs of certain components of furniture are legion. As noted above for the kitchen applications, the structural polymer core assembly 100, 101 could provide a substructure under a decorative paneling, for example as a core for a laminated book shelf or veneered table. Additionally, portions of this concept could be applied to seating. Some of the performance characteristics of furniture applications are similar to those of automotive and marine interiors such as decorative layers that offer aesthetic value, fabric backings that serve tactile or acoustical purposes, structural components that add integrity, as well as efficiency of design and economics. Structural polymer core assembly designs could also be utilized for a myriad of office furniture applications. Among these are office partitions. Partitions or cubicle walls demand an interesting set of aesthetic and functional properties. Among these is the absorption of ambient noise in an environment where individuals work independently yet within a common work area. In order to meet this need, a structural polymer core assembly 100, 101 could be introduced which utilizes several strategies to reduce these ambient noise levels. For example, an assembly could be designed with a series of perforations (thus enabling the entrapment of specific frequencies); yet said assembly could incorporate a layer of soft and flexible batting by which to further dampen the incident sound waves. Finally the nature of the structural core 20, 21 itself affords a greater surface area than a flat core component, and is characterized by a large percentage of airspace relative to the volume of the structural core 20, 21. These potential countermeasures could work in unison to provide a unique solution to an industry demand. The structural polymer core assembly 100, 101 could simultaneously meet the other rigorous requirements typical of office furniture such as fire retardance, modularity of components, strength and durability, to name just a few.

For the various methods of utilizing a structural polymer core assembly 100, 101, some of which but not all have been outlined in the paragraphs above, numerous geometries can be conceived and even optimized for specific applications depending upon the relative priority of performance requirements.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims:

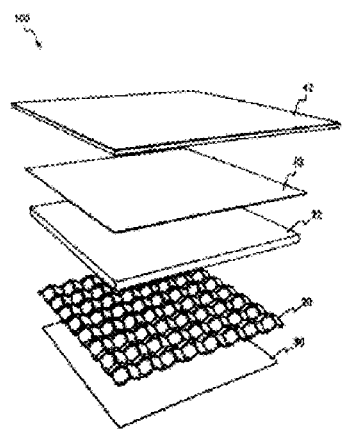

The invention claimed is:

1. A thermoformable composite structure having a specified width, length, and height defining a top and bottom of said composite structure comprising:
    a single thermoformable three dimensional structural core constructed of a fiber infused thermoplastic with a pyramidal geometric pattern repeated along the length thereof, said pyramidal geometric pattern repeated along the width thereof;
    said pyramidal geometric pattern being symmetric about a neutral axis of said structural core;
    said pyramidal geometric pattern comprised of a plurality of pyramidal shapes;
    each of said pyramidal shapes having four side faces which intersect to form edges;
    each of said edges including a radius;
    said pyramidal geometric pattern providing a series of peaks and troughs that have flat tops and bottoms;
    a thermoformable first reinforcement layer positioned above said structural core and thermally bonded thereto wherein said first reinforcement layer is constructed of the same fiber infused thermoplastic as said structural core; and
    a thermoformable second reinforcement layer positioned below said structural core and thermally bonded thereto wherein said second reinforcement layer is constructed of the same fiber infused thermoplastic as said structural core.

2. The composite structure of claim 1 further comprising:
a decorative layer positioned above said first reinforcement layer and bonded thereto.

3. The composite structure of claim 1 further comprising:
an acoustical batting layer positioned between said first reinforcement layer and said structural core.

4. The composite structure of claim 1 wherein said first and second reinforcement layers contain openings along the length and width thereof.

5. The composite structure of claim 1 wherein at least one component therein includes fire retardant chemicals.

6. The composite structure of claim 1 wherein said structural core and said first and second reinforcement layers are constructed of a translucent thermoplastic.

7. An automotive headliner thermoformable composite structure having a specified width, length, and height defining a top and bottom of said automotive headliner composite structure comprising:
a single thermoformable three dimensional structural core constructed of a fiber infused thermoplastic with a pyramidal geometric pattern repeated along the length thereof, said pyramidal geometric pattern repeated along the width thereof;
said pyramidal geometric pattern being symmetric about a neutral axis of said structural core;
said pyramidal geometric pattern comprised of a plurality of pyramidal shapes;
each of said pyramidal shapes having four side faces which intersect to form edges;
each of said edges including a radius;
said pyramidal geometric pattern providing a series of peaks and troughs that have flat tops and bottoms;
a first thermoformable reinforcement layer positioned above said structural core and thermally bonded thereto wherein said first reinforcement layer is constructed of the same fiber infused thermoplastic as said structural core;
a second thermoformable reinforcement layer positioned below said structural core and thermally bonded thereto wherein said second reinforcement layer is constructed of the same fiber infused thermoplastic as said structural core; and
a decorative layer positioned above said first reinforcement layer and bonded thereto.

8. The automotive headliner composite structure of claim 7 further comprising:
an acoustical batting layer positioned between said first reinforcement layer and said structural core.

9. The automotive headliner composite structure of claim 7 further comprising:
an acoustical batting layer positioned between said second reinforcement layer and said structural core.

10. The automotive headliner composite structure of claim 7 wherein at least one component therein includes fire retardant chemicals.

11. The automotive headliner composite structure of claim 7 wherein at least one of said first and second reinforcement layers contain repeated openings along the length and width thereof.

12. The composite structure of claim 1 wherein said fiber infused thermoplastic has a tensile modulus of less than 1,000,000 pounds per square inch.

13. The automobile headline composite structure of claim 7 wherein said fiber infused thermoplastic has a tensile modulus of less than 1,000,000 pounds per square inch.

* * * * *

UNITED STATES PATENT AND TRADEMARK OFFICE
CERTIFICATE OF CORRECTION

| | | |
|---|---|---|
| PATENT NO. | : 7,297,390 B2 | Page 1 of 13 |
| APPLICATION NO. | : 10/352803 | |
| DATED | : November 20, 2007 | |
| INVENTOR(S) | : Richard A. Simmons | |

It is certified that error appears in the above-identified patent and that said Letters Patent is hereby corrected as shown below:

The Title Page, showing an illustrative figure, should be deleted and substitute therefor the attached Title Page.

Delete drawings sheet 1-11 and substitute therefor the drawing sheets, consisting of figs. 1-9 as shown on the attached page.

Signed and Sealed this

Twenty-seventh Day of May, 2008

JON W. DUDAS
*Director of the United States Patent and Trademark Office*

(12) United States Patent
Simmons et al.

(10) Patent No.: US 7,297,390 B2
(45) Date of Patent: Nov. 20, 2007

(54) STRUCTURAL POLYMER CORE ASSEMBLY, METHOD OF MANUFACTURE AND METHOD OF USE

(76) Inventors: Richard A. Simmons, 1419 Highland Bluff, Atlanta, GA (US) 30339; John R. Stoll, 455 Surveyor's Point, Suwanee, GA (US) 30024; Keith Panik, 365 Cherry Grove Rd., Ball Ground, GA (US) 30107; F. Arthur Simmons, 4250 Paran Walk NW., Atlanta, GA (US) 30327

( * ) Notice: Subject to any disclaimer, the term of this patent is extended or adjusted under 35 U.S.C. 154(b) by 0 days.

(21) Appl. No.: 10/352,803

(22) Filed: Jan. 28, 2003

(65) Prior Publication Data
US 2004/0081797 A1    Apr. 29, 2004

Related U.S. Application Data

(60) Provisional application No. 60/352,707, filed on Jan. 28, 2002.

(51) Int. Cl.
*B32B 1/00* (2006.01)
*B60J 7/08* (2006.01)
*B60R 13/02* (2006.01)
*B62D 25/06* (2006.01)

(52) U.S. Cl. .......... 428/178; 428/137; 428/138; 428/180; 296/214; 181/288; 181/290; 181/292; 52/789.1; 52/793.1

(58) Field of Classification Search .......... 428/137, 428/138, 178, 180, 185, 187, 542.2, 903.3; 181/288, 290, 291, 292; 296/214; 52/789.1, 52/793.1
See application file for complete search history.

(56) References Cited

U.S. PATENT DOCUMENTS

| | | | |
|---|---|---|---|
| 2,809,908 A | 10/1957 | French | 154/45.9 |
| 3,086,899 A | 4/1963 | Smith et al. | 154/45.9 |
| 3,199,963 A | 8/1965 | Bengtsson | 29/183 |
| 3,664,906 A | 5/1972 | Hartig | 161/68 |
| 3,822,762 A * | 7/1974 | Crispin et al. | 181/292 |
| 3,842,768 A | 10/1974 | Maistre | 114/16 |
| 3,849,237 A | 11/1974 | Zetlin | 161/68 |
| 3,884,646 A | 5/1975 | Kenney | 29/191.4 |
| 3,992,835 A | 11/1976 | Saveker | 52/220 |
| 4,025,996 A * | 5/1977 | Saveker | 428/594 |
| 4,290,248 A | 9/1981 | Kemerer et al. | 52/309.16 |
| 4,348,442 A * | 9/1982 | Figge | 428/72 |
| 5,009,043 A * | 4/1991 | Kurrasch | 52/145 |

(Continued)

*Primary Examiner*—Donald J. Loney
(74) *Attorney, Agent, or Firm*—Nixon Peabody LLP

(57) ABSTRACT

A composite structure, and method of manufacturing it, having a specified width, length, and height defining a top and bottom the composite structure. The composite structure includes a three dimensional structural core constructed of a polymer with a first series of a geometric pattern repeated along its length. The structural core also has a second series of the geometric pattern repeated along the width thereof. The geometric patter may be a sinusoidal curve or a substantially pyramidal shape. The composite structure also includes a first reinforcement layer made of a polymer positioned above the structural core and bonded thereto. It also includes a second reinforcement layer made of a polymer that is positioned below the structural core and bonded thereto. The composite structure may also include a decorative layer above the first reinforcement layer, an acoustical batting layer positioned between the first reinforcement layer and the structural core, and may include fire retardant chemicals.

13 Claims, 11 Drawing Sheets